(12) United States Patent
Gray et al.

(10) Patent No.: US 6,303,189 B1
(45) Date of Patent: Oct. 16, 2001

(54) METHOD FOR INCREASING THE OPEN TIME OF AQUEOUS COATINGS

(75) Inventors: Richard Thomas Gray, Levittown; Jungsik Lee, Hatfield, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 08/398,315

(22) Filed: Mar. 3, 1995

(51) Int. Cl.$^7$ .................................................. B05D 3/02
(52) U.S. Cl. ................... 427/385.5; 524/386; 524/388; 524/501; 524/457; 524/507
(58) Field of Search .................... 524/507, 501, 524/457, 386, 388; 427/385.5, 385

(56) References Cited

U.S. PATENT DOCUMENTS

| | | | |
|---|---|---|---|
| 3,919,145 | 11/1975 | Eckhoff . | |
| 4,636,546 | * 1/1987 | Chao | 524/507 |
| 4,954,559 | * 9/1990 | Den Hartog et al. | 524/507 |
| 5,021,290 | 6/1991 | Rowell | 428/319 |
| 5,204,404 | * 4/1993 | Werner, Jr. et al. | 524/507 |
| 5,270,380 | 12/1993 | Adamson et al. . | |
| 5,326,808 | * 7/1994 | Floyd et al. | 524/507 |
| 5,401,795 | 3/1995 | Brock et al. | 524/539 |

FOREIGN PATENT DOCUMENTS

| | | |
|---|---|---|
| 0 350 157 A2 | 5/1989 | (EP) . |
| 0 379 158 A2 | 1/1990 | (EP) . |
| 2 124 239 A | 7/1982 | (GB) . |

* cited by examiner

*Primary Examiner*—Judy M. Reddick
(74) *Attorney, Agent, or Firm*—Ronald D. Bakule

(57) ABSTRACT

A method for extending the open time of an aqueous coating composition is provided. This method extends the time during which an aqueous coating can be applied or rebrushed without damaging the film. The open time improvement of this invention is useful for a variety of coatings including paints, stains, varnishes, adhesives and inks. The improvement in open time comes from the addition of an aqueous polyurethane dispersion to an aqueous coating composition having at least one film-forming latex polymer, where the glass transition temperature of the polyurethane dispersion is less than that of the latex polymer.

6 Claims, No Drawings

METHOD FOR INCREASING THE OPEN TIME OF AQUEOUS COATINGS

The present invention relates to a method for increasing the open time of an aqueous coating and aqueous coating compositions providing useful open time. Open time is the time that an aqueous coating remains workable after it has been applied to a substrate. Open time is important in aqueous coatings, such as latex paints, to permit rebrushing over a freshly coated wet surface without causing defects such as brush marks or lap lines in the final dried coating.

One method for improving the open time of an aqueous coating is disclosed in U.S. Pat. No. 5,270,380. This method involves the reactive interaction between a latex polymer and a modifying compound in which the latex polymer and modifying compound become chemically bound.

The reactive interaction disclosed in the '380 patent is a useful method for increasing the open time of an aqueous coating, however, the choice of a modifying compound is limited to only those compounds capable of reacting with the particular latex polymer in the coating composition. The problem is that a given modifying compound will only work with a limited number of polymer chemistries, and therefore many different modifying compounds are required to effect an open time improvement across the wide range of possible latex polymers used in different coating compositions.

The present invention provides an alternate method for improving the open time of an aqueous coating, wherein one modifying compound may be used universally with all latex polymer chemistries and in all coating compositions since no interaction is required between the modifying compound and latex polymer.

In a first aspect of the present invention, there is provided a method for extending the open time of an aqueous coating composition comprising:
 a) forming an aqueous coating composition comprising at least one film-forming latex polymer,
 b) admixing with said coating composition at least one aqueous-based polyurethane dispersion having a glass transition temperature less than the glass transition temperature of the latex polymer;
 c) applying said aqueous coating composition to a substrate; and
 d) drying said aqueous coating composition.

In a second aspect of the present invention, there is provided an aqueous coating composition having extended open time comprising at least one film-forming latex polymer and at least one aqueous-based polyurethane dispersion having a glass transition temperature less than the glass transition temperature of the film-forming latex polymer.

Film forming polymers useful in this invention are those capable of forming a continuous film upon drying. Film forming polymers are those with a glass transition temperature (Tg) below the drying temperature or, in the alternative, are polymers with a higher Tg used in conjunction with levels of volatile coalescents effective to provide a film formation temperature sufficiently below the drying temperature, thereby effecting the formation of a continuous film on a substrate. Preferably, the latex polymer contains at least one polymeric component with a glass transition temperature between −15° C. and +50° C. as measured by differential scanning calorimetry (DSC). Most preferably the Tg of the film-forming polymer is in the range of from +10° C. to +35° C.

The latex polymer useful in this invention can be a homopolymer, a copolymer or a mixtures of such polymers. The latex polymer is film-forming and may be a single film-forming polymer or a mixture of different polymer compositions, provided the mixture contains at least one film-forming latex polymer and that the aqueous composition formed from the mixture is film-forming.

The film-forming latex polymer of this invention is a substantially thermoplastic, or substantially uncrosslinked, polymer when it is applied to a substrate. Low levels of deliberate or adventitious crosslinking may be present. It is important, however, that the quality of the film formation not be materially impaired by this crosslinking.

The film-forming latex polymer may be formed from at least one ethylenically-unsaturated monomer such as, for example, alkyl acrylates and methacrylates wherein the alkyl group contains from one to eighteen carbon atoms; acrylamide or substituted acrylamides; styrene or substituted styrenes; butadiene; vinyl acetate or other vinyl esters; vinyl monomers such as vinyl chloride, vinylidene chloride, N-vinyl pyrrolidone; acrylonitrile or methacrylonitrile and ethylene. Low levels of copolymerizable ethylenically-unsaturated acid monomers, in the range of 0.1% to 10% may also be used. Preferred monomers for use in this invention include methyl methacrylate, butyl acrylate, styrene, acrylonitrile, butyl methacrylate and methacrylic acid.

The latex polymers may be made by conventional polymerization techniques well known in the art. A preferred method of making the latex polymer is by conventional emulsion polymerization. The latex polymers useful in the present invention are not limited to any particular particle size, molecular weight, chemistry or physical shape.

While the particle size is not critical, a preferred particle size of the latex polymer is in the range from 50 nanometers to 300 nanometers in diameter. The morphology of the particles is not critical. The particles may be a single phase or be composed of two or more phases such as, for example, core/shell particles, core/shell particles with shell phases incompletely encapsulating the core, core/shell particles with a multiplicity of cores and interpenetrating networks of particles.

Polyurethane dispersions useful in the present invention are aqueous-based. "Aqueous-based" means that in the final form, regardless of the method of synthesis, the polyurethane particles are distributed as the dispersed phase in water and that water serves as the continuous medium. The polyurethane dispersion (PUD) is non-reactive with the polymer latex. The glass transition temperature of the polyurethane particles are in the range of from −50° C. to +10°C. , preferably in the range of from −50° C. to −10° C., as measured by differential scanning calorimetry. A critical element of the present invention is that the Tg of the polyurethane polymer must be less than the Tg the latex polymer.

Polyurethane dispersions useful in this invention have particle sizes in the range of from 10 nanometers to 100 nanometers. A preferred particle size is about 30 nanometers. A polyurethane dispersion found to be preferably useful in this invention is Sancure® 815 (BFGoodrich) having a particle size of 30 nanometers and a glass transition temperature of −40° C.

The polyurethane dispersion is present in the aqueous coating composition at from 10% to 50% by weight based on solids of the polyurethane to the total polymer solids. Preferably the polyurethane dispersion is present at about 20% by weight solids based on total polymer solids.

The aqueous coating composition may contain one or more water-soluble coalescents to aid in film formation. The coalescents may be separately added or may be present as a result of coalescent use in the manufacture of a component in the coating composition such as, for example, the polyurethane dispersion. Preferable water-soluble coalescents include, for example, alkylene glycols in the range of from 0% to 40%, by weight based on the weight of the dry latex polymer. Alkylene glycols include, for example, ethylene glycol, propylene glycol and mixtures thereof.

Aqueous coating composition is free from water-insoluble coalescents. "Water-insoluble coalescents" as used herein are defined as organic compounds having a boiling point at atmospheric pressure of less than about 250° C. and a water solubility in the range from 0.1% to 10%, by weight in water at 25° C. Water-insoluble coalescents include, for example, 2,2,4-trimethylpentane-1,3-diol monoisobutyrate (Texanol®, Eastman Chemical).

The aqueous coating composition is prepared by conventional paint making techniques which are well known in the coatings art. First, the pigment and other adjuvants are well-dispersed in an aqueous medium under high shear, such as is afforded by a Cowles® mixer. Then the polymer latex and aqueous-based polyurethane dispersion are added under low shear stirring along with other coating adjuvants as desired. The aqueous coating composition may contain, in addition to the polymers, the coalescing agents and the pigment, conventional coatings adjuvants such as, for example, emulsifiers, thickeners, humectants, plasticizers, fillers, curing agents, wetting agents, biocides, anti-foaming agents, colorants, waxes, and anti-oxidants.

The substrates to which the coating composition of this invention may be applied include, for example, wood, plaster, cementitious substrates and previously primed or coated substrates. Preferred substrates are indoor and outdoor architectural substrates such as walls, ceilings and floors. The coating composition of this invention may be applied to a substrate by methods well known in the art of applying coatings such as, for example, air-assisted spray, airless spray, brush and roller.

A preferred embodiment of the invention is a coating with Sancure® 1818 or Sancure 815® (BF Goodrich) as the polyurethane dispersion that is curable at ambient conditions of relative humidity, air velocity and temperature, wherein the temperature is between 0° C. and 40° C. The temperature must be greater than 0° C. in that the coating composition is an aqueous composition.

Measurement of Open Time

The open time of the aqueous coating was measured by brush applying a stripe on a coated paper chart (12 H Spreading Rate Leneta Chart) with a 5.1 centimeter brush. Crosses in the shape of an "X" were immediately etched into the freshly coated substrate by a tongue depressor. A second coat was applied by brushing fresh paint over and perpendicular to the stripe over one of the "Xs" at three minute intervals. The second coat tests continued until it appeared that the second coat no longer melted into the first coat causing the "X" to blend into the film to a maximum of fifteen minutes. The paint was dried at 25° C. and 50% relative humidity. After the paint was completely dried, open time was rated on when the second coat melted in with the first coat and was no longer visible. The open time was noted as the maximum time the "X" was not visible in the dried film.

EXAMPLE 1

Preparation of aqueous Coating Compositions

Three aqueous coatings compositions (Samples A, B and C) were prepared. Each aqueous coating composition utilized the same emulsion polymer latex which had a monomer composition of 19.5% butyl acrylate, 21.4% ethylhexyl acrylate, 56.6% methyl methacrylate and 2.5% methacrylic acid. The emulsion polymer latex had a pH of 7.2, a 45% solids level and an average polymer particle size of 90 nm.

Samples A and B are Comparative because they do not contain the aqueous polyurethane dispersion. Comparative Sample A utilizes Texanol® as a water-insoluble coalescent. No water-insoluble coalescent is added to Comparative Sample B. Sample C of the invention contains the polyurethane dispersion (PUD), Sancure® 1818 (BF Goodrich), substituted in the formulation for an equal portion of the film-forming latex polymer, by weight based on solids, to maintain the same overall solids level.

| AQUEOUS COATINGS FORMULATIONS | | | |
|---|---|---|---|
| | Amount (parts by weight) | | |
| Ingredient | A (Comparative) | B (Comparative) | C (With PUD) |
| Mix in Cowles Mixer | | | |
| Propylene glycol | 30 | 30 | 30 |
| Dispersant | 35.8 | 35.8 | 35.8 |
| Defoamer | 3 | 3 | 3 |
| Biocide | 1.7 | 1.7 | 1.7 |
| Titanium dioxide | 250.4 | 250.4 | 250.4 |
| Water | 30 | 30 | 30 |
| Let Down with | | | |
| Latex polymer (45% solids) | 504.9 | 504.9 | 425.8 |
| Polyurethane dispersion (35% solids) | 0 | 0 | 109.5 |
| Propylene glycol | 50 | 50 | 50 |
| Texanol ® | 34.1 | 0 | 0 |
| Defoamer | 2 | 2 | 2 |
| Thickener | 46.6 | 53 | 55.2 |
| Water | 109.3 | 139.2 | 110.8 |
| Properties | | | |
| Volume % Solids | 33.1 | 33.1 | 33.1 |
| Stormer Viscosity (KU) | 90 | 90 | 90 |
| ICI Viscosity | 2.1 | 2.1 | 2.1 |

TABLE 1

| Open Time Results | |
|---|---|
| Sample | Open Time (minutes) |
| A | 9 |
| B | 9 |
| C | >15 |

The results show a greater than fifty percent increase in open time of the aqueous coating composition of the invention containing the aqueous-based polyurethane dispersion.

What is claimed is:

1. A method for extending the open time of an aqueous coating composition comprising:
   a) forming an aqueous coating composition comprising at least one film-forming latex polymer formed from at least one ethylenically-unsaturated monomer, said film-forming polymer having a glass transition temperature in the range of from −15° C. to +50° C.;
   b) admixing with said aqueous coating composition:
   at least one aqueous-based polyurethane dispersion having a glass transition temperature less than the glass transition temperature of the latex polymer, said polyurethane dispersion being non-reactive with said film-forming latex polymer; and at least one water soluble coalescent;

b) applying said aqueous coating composition to an architectural substrate; and c) drying said aqueous coating composition at temperatures in the range of from 0° C. to 40° C.

wherein said aqueous coating composition is free from water-insoluble coalescents.

2. The method of claim 1 wherein the polyurethane has a glass transition temperature in the range from −50° C. to −10° C.

3. The method of claim 1 wherein the polyurethane dispersion is present in the aqueous composition at from 10 percent to 50 percent based on the weight of the latex polymer solids.

4. An aqueous coating composition having extended open time comprising:

a) at least one film-forming latex polymer formed from at least one ethylenically-unsaturated monomer, said film-forming polymer having a glass transition temperature in the range of from −15° C. to +50° C.;

b) at least one aqueous-based polyurethane dispersion having a glass transition temperature less than the glass transition temperature of the film-forming latex polymer, wherein said aqueous-based polyurethane dispersion is non-reactive with said film-forming latex polymer;

c) at least one water soluble coalescent;

wherein said aqueous coating composition is free from water-insoluble coalescents.

5. The aqueous coating composition of claim 4 wherein the water soluble coalescent in an alkylene glycol.

6. The method of claim 1 wherein the water soluble coalescent is an alkylene glycol.

* * * * *